May 10, 1938. A. GUDMUNDSEN 2,117,091
WATER SOFTENER
Filed June 15, 1936
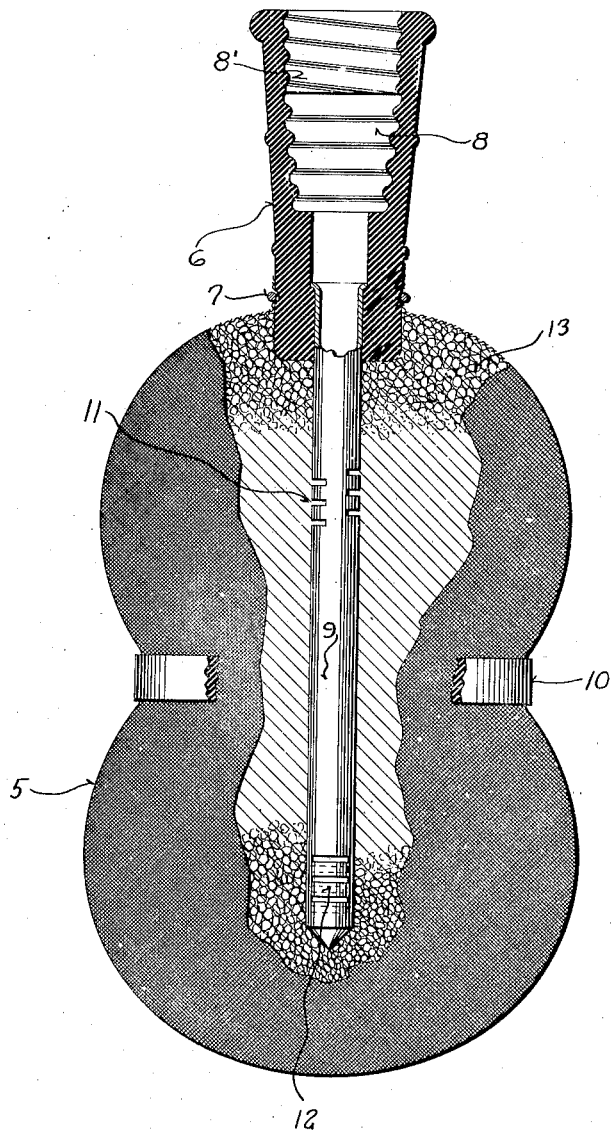
Inventor
Austin Gudmundsen
By Hamilton Jones
Attorney Patented May 10, 1938

2,117,091

UNITED STATES PATENT OFFICE 2,117,091

WATER SOFTENER

Austin Gudmundsen, Milwaukee, Wis., assignor to Gudmundsen-Stratton Laboratories, Inc., Milwaukee, Wis., a corporation of Wisconsin Application June 15, 1936, Serial No. 85,244

7 Claims. (Cl. 210—24)

This invention relates to a water softening device and particularly to devices in which the softening medium is a granular silicate having the property of exchanging its sodium for the calcium or magnesium of the water with a consequent softening effect upon the water being treated. Either natural or synthetic zeolites are most frequently used as the base exchanging material, although it is recognized that substitutes are also available.

The prior art devices have generally been so constructed that water being softened by passing through the zeolite bed has of necessity passed directly therethrough, either downwardly or upwardly. While these methods have been successfully employed in softeners of moderate size, in both cases definite limitations are encountered when the construction of a unit of minimum size for portable use is attempted. Many attempts have been made to produce a small zeolite softener which could be used at sink or lavatory faucets. However, there are certain requirements which must be met in such a device to have practical utility.

First, the capacity of the device per unit volume of zeolite mineral used should be as high as possible in order that it may be able to treat a comparatively large volume of water between regenerations.

Second, the device must have a flow rate such that the time required to fill a receptacle with softened water is not excessive.

Third, the unit must be small and light in construction, easily transportable, and convenient to attach at the point of use.

Fourth, the unit must have small thermal capacity so that it can be used interchangeably on hot or cold water with a minimum of inconvenience.

These requirements can be met if the softening action of the zeolite is most effectively employed. The softening capacity of zeolite is related to the size of the particles used. The smaller the grains of the mineral the more softening will be accomplished per unit weight. Present methods in common use for domestic water softening cannot take advantage of fine zeolite because of the increased bed resistance and backwash problems incident to downflow softeners, and on account of washing out of the fine zeolite if used in the conventional upflow softener.

It is therefore an object of this invention to provide a softening device so constructed as to permit the use of fine zeolite very effectively and with none of the disadvantages of the previous methods.

In general this object is attained through the use of a porous container enclosing a tightly packed bed of fine grain zeolite, and an inlet distributor tube which introduces water to the interior of the zeolite bed, allowing it to flow equally in all directions through the bed and through the outer porous wall which acts both as a container and a flow distributing screen for the zeolite bed.

Another object of this invention is to provide means for maintaining a fine grain zeolite material in a compact bed under sufficient uniform pressure to preclude the water short circuiting or establishing rivulets or channels.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

The single feature is a view in side elevation with parts broken away and in section.

Referring now particularly to the accompanying drawing, the numeral 5 designates a flexible container made of a closely woven fabric suitable for retaining a base exchanging material, or zeolite, of fine mesh but through which fluid may pass. In the preferred embodiment of the invention shown, the container 5 is formed of fabric but it is understood however that the container may be made of a fine mesh wire screen or of any other suitable material.

The container 5 which is in the form of a bag, has its open end securely and permanently tied to a rubber socket 6 by means of a clamping ring 7. The socket 6 extends into the container 5 a sufficient distance and the clamping ring is sufficiently rigid to insure a connection which will resist any strain to which it might be subjected.

The outer end of the socket 6 is relatively flexible and has a tapered bore 8 threaded as at 8' to facilitate its being secured to an ordinary water faucet (not shown). Permanently secured in the inner end of the bore 8 is a metal tube 9 which extends down into the interior of the container 5. The lower end of the tube is closed and pointed and at intermediate points the tube is slotted as at 11 and 12 to provide ports for the admission of water to the zeolite 13 or other material which fills the container 5.

The zeolite or other material used has a finer grain size than that heretofore in general use for water softening purposes, but because the flow is outward and the treated water exudes from the entire surface area of the unit there is no danger of compacting the zeolite to the point of stopping the flow. However, through the use of a compression band 10 embracing the medial portion of the container between the two discharge ports 11 and 12, the container contents are maintained in a proper state of compression.

The compression band 10 in the embodiment shown, is made of rubber and is of such strength as to compact the fine meshed grains sufficiently to prevent the formation of rivulets or channels and insure all portions of the zeolite material being uniformly used. It is understood that the compression band 10 might well be of another resilient material as long as it fulfills its function and keeps the zeolite grains at all time in intimate contact with each other. By locating the band medially of the slots 11 and 12, the water passes through the greatest possible zeolite area before it emerges from the container surface, since the band forms the container into two substantially globular portions each concentric about one of the sets of discharge slots.

To assemble the unit, the container 5 is filled with zeolite and the tube 9 is inserted into the open end of the container. As before noted, the tube is pointed at its closed end to facilitate the insertion thereof into the filled container. Upon the insertion of the tube 9 into the container in such manner as to locate the water discharge slots as before described the open end of the container is tied to the socket by the clamping ring 7.

Then after the band 10 is applied, the device is ready for use.

From the foregoing description taken in connection with the accompanying drawing, it will be readily apparent to those skilled in the art, that this invention provides a water softener possessing very marked advantages, among which the following may be noted:

First, the greatest possible area of outlet screen surface per unit volume of mineral is provided since the porous container itself is substantially all screen. This makes it possible to use very fine zeolite in a relatively thin layer without excessive resistance in the bed, and flow rates of thirty times those recommended for standard softening devices can be employed without loss of softening efficiency.

Second, better flow characteristics to obtain superior use of base exchange properties are obtained. It is well-known that chemical reactions proceed at a rate proportional to the concentration of the reagent. It then follows that a longer period of contact of water with zeolite would be required to remove the last fifty per cent of hardness in water than for the first fifty per cent. That is, the most efficient arrangement of a zeolite bed would be obtained where the rate of flow of the water with respect to the mineral particles decreases as it proceeds through the bed from inlet to outlet.

These characteristics of flow are present in the present invention since the water is introduced at the center of the bed through a small screen and radiates out through the mineral, the lineal-velocity of the water thus decreasing as the third power of the radius. The velocity of the water is therefore lowest near the outer surface. This makes it possible to employ a relatively thin bed of zeolite and yet not lose capacity of the unit between regenerations.

Third, through the use of fine zeolite mineral it is possible to incorporate in a very small device a high total softening capacity between regenerations per volume of zeolite mineral used.

Fourth, a high rate of flow with low bed resistance is attained by virtue of the extensive outer screen surface and short water path through the bed.

Fifth, being small in size the unit has low thermal capacity, eliminating waste of softened water and time required when it is used on hot and cold water interchangeably.

What I claim as my invention is:

1. A water softening device comprising, a fabric container of porous material, means for connecting the container to a source of water supply and adapted to dispense water from a predetermined point into said container, a base exchanging material within said container and surrounding said point so that water liberated therefrom passes through a given area of said material regardless of its direction of flow, and elastic means acting on the container for maintaining the material elastically in a state of compression.

2. A water softening device comprising, a porous flexible container, a body of fine grained base exchanging material in the container, elastic means acting on the exterior of the container to maintain the base exchanging material contained therein in a state of elastic compression sufficient to preclude the formation of channels by water flowing therethrough but insufficient to stop the flow of water from the center thereof to the exterior thereof, and means for introducing water to be treated under pressure into the interior of said body of base exchanging material for passage outwardly therethrough to exude from the surface of the container.

3. A device for the treatment of water comprising a cloth bag, a body of fine grained base exchanging material in the bag, an elastic compression band embracing the bag and elastically holding the contents thereof in a state of compression, and means for introducing water to be treated under pressure into the interior of said body of base exchanging material for passage outwardly therethrough in substantially all directions to exude from substantially the entire surface of the bag.

4. A device for the treatment of water comprising a cloth bag, a body of fine grained base exchanging material in the bag, a compression band encircling the medial portion of the bag to maintain the contents thereof in a state of compression and to give the bag an external shape similar to two joined globular bodies, and means entering the bag from one end thereof for introducing water to be treated into the interior of the body of base exchanging material, said means having water discharge ports located near the centers of the two globular bodies so that water discharged from both of said ports and flowing outwardly to the surface of the bag passes through substantially the same quantity of said base exchanging material.

5. A water softener comprising, a tube having means on its outer end for connection with a source of water supply and having its inner end portion perforated with the extremity thereof closed so as to provide a plurality of discharge ports for water introduced into the tube, a body of base exchanging mineral having the inner end portion of the tube embedded in the core thereof to receive water issuing therefrom, and a porous outer container of fine mesh fabric elastically holding the body of base exchanging mineral in position.

6. A water conditioning device comprising, a quantity of granulated base exchanging mineral, a porous bag-like container for the mineral means engaging the exterior of the bag-like container for elastically confining said base exchanging mineral within the bag to a mass of definite shape, said means permitting the passage of water therethrough, and means extending into the interior of said mass of base exchanging mineral for conducting water into the core thereof to flow outwardly through the mass of base exchanging mineral, said confining means elastically retaining the mass of mineral so shaped with respect to the means for conducting water into its interior that regardless of the direction the water takes in flowing out to the surface of the device its path is always of substantially the same length.

7. A water softener comprising, a tube having an outer end portion connectible with a source of water supply, and an inner end portion perforated to provide a plurality of discharge ports and having the extreme inner end thereof closed, a fabric bag enclosing the inner end portion of the tube and having its mouth secured to the outer end portion of the tube, fine grain zeolite filling said fabric bag, and expansible and contractible means engaging a minor portion of the exterior of the bag and leaving a major portion of the bag's exterior surface unobstructed to elastically confine the zeolite contained therein to a definite shape with all portions of the zeolite substantially uniformly compressed, said means yielding to the pressure of outwardly flowing water which issues from the inner end portion of the tube and flows outwardly through the zeolite and the fabric bag.

AUSTIN GUDMUNDSEN.